(12) United States Patent
Works et al.

(10) Patent No.: US 11,247,518 B1
(45) Date of Patent: Feb. 15, 2022

(54) WEIGHT DISTRIBUTING AND SWAY CONTROL HITCH WITH PIVOTING SPRING ARMS FOR LOADING RELATIVE TO SPRING ARM SUPPORTS

(71) Applicant: B & W Custom Truck Beds, Inc., Humboldt, KS (US)

(72) Inventors: Joseph W. Works, Humboldt, KS (US); Travis M. McCall, Humboldt, KS (US)

(73) Assignee: B & W Custom Truck Beds, Inc., Humboldt, KS (US)

( * ) Notice: Subject to any disclaimer, the term of this patent is extended or adjusted under 35 U.S.C. 154(b) by 56 days.

(21) Appl. No.: 16/925,907

(22) Filed: Jul. 10, 2020

Related U.S. Application Data

(60) Provisional application No. 62/872,880, filed on Jul. 11, 2019.

(51) Int. Cl.
*B60D 1/24* (2006.01)
*B60D 1/34* (2006.01)
*B60D 1/06* (2006.01)

(52) U.S. Cl.
CPC ............. *B60D 1/247* (2013.01); *B60D 1/345* (2013.01); *B60D 1/06* (2013.01)

(58) Field of Classification Search
CPC ................................ B60D 1/345; B60D 1/247
See application file for complete search history.

(56) References Cited

U.S. PATENT DOCUMENTS

| | | | |
|---|---|---|---|
| 2,597,657 A | 5/1952 | Mathisen | |
| 3,011,799 A | 12/1961 | Lance | |
| 3,129,957 A * | 4/1964 | Bernard | B60D 1/345 |
| | | | 280/406.2 |
| 3,403,928 A * | 10/1968 | Laughlin | B60D 1/345 |
| | | | 280/406.2 |
| 3,542,395 A * | 11/1970 | Millikan | B60D 1/345 |
| | | | 280/406.2 |
| 3,814,463 A * | 6/1974 | Tunesi | B60D 1/07 |
| | | | 280/406.2 |
| 3,879,061 A | 4/1975 | Thompson | |
| 3,900,212 A | 8/1975 | Ewing | |
| 4,053,174 A * | 10/1977 | Guettler, Jr. | B60D 1/247 |
| | | | 280/406.2 |
| 4,213,627 A | 7/1980 | Thompson | |
| 4,230,333 A | 10/1980 | Persyn | |
| 5,580,076 A | 12/1996 | DeRoule et al. | |

(Continued)

OTHER PUBLICATIONS

Photographs of weight distributing hitch publicly displayed in 2017.

*Primary Examiner* — Kevin Hurley
(74) *Attorney, Agent, or Firm* — Erickson Kernell IP, LLC; Kent R. Erickson

(57) ABSTRACT

A weight distributing hitch assembly for towing a trailer behind a towing vehicle is disclosed having spring arms pivotally mounted to a hitch head so that the distal ends of the spring arms may be rotated downward relative to a spring arm support mounted on a side of the trailer for loading the spring arm on the spring arm support. The spring arms are preferably rotated using an actuator connected between the hitch head and at least one of the spring arms for applying a downward rotational force on the spring arm relative to said spring arm support.

13 Claims, 16 Drawing Sheets

(56) References Cited

U.S. PATENT DOCUMENTS

| | | | | |
|---|---|---|---|---|
| 6,142,500 A | * | 11/2000 | Sargent | B60D 1/02 |
| | | | | 280/405.1 |
| 7,857,344 B2 | | 12/2010 | Hensley | |
| 7,934,742 B2 | | 5/2011 | Anderson et al. | |
| 2006/0027997 A1 | * | 2/2006 | Grace | B60D 1/247 |
| | | | | 280/417.1 |
| 2014/0225350 A1 | | 8/2014 | Gramlin | |
| 2021/0094371 A1 | * | 4/2021 | McAllister | B60D 1/46 |

\* cited by examiner

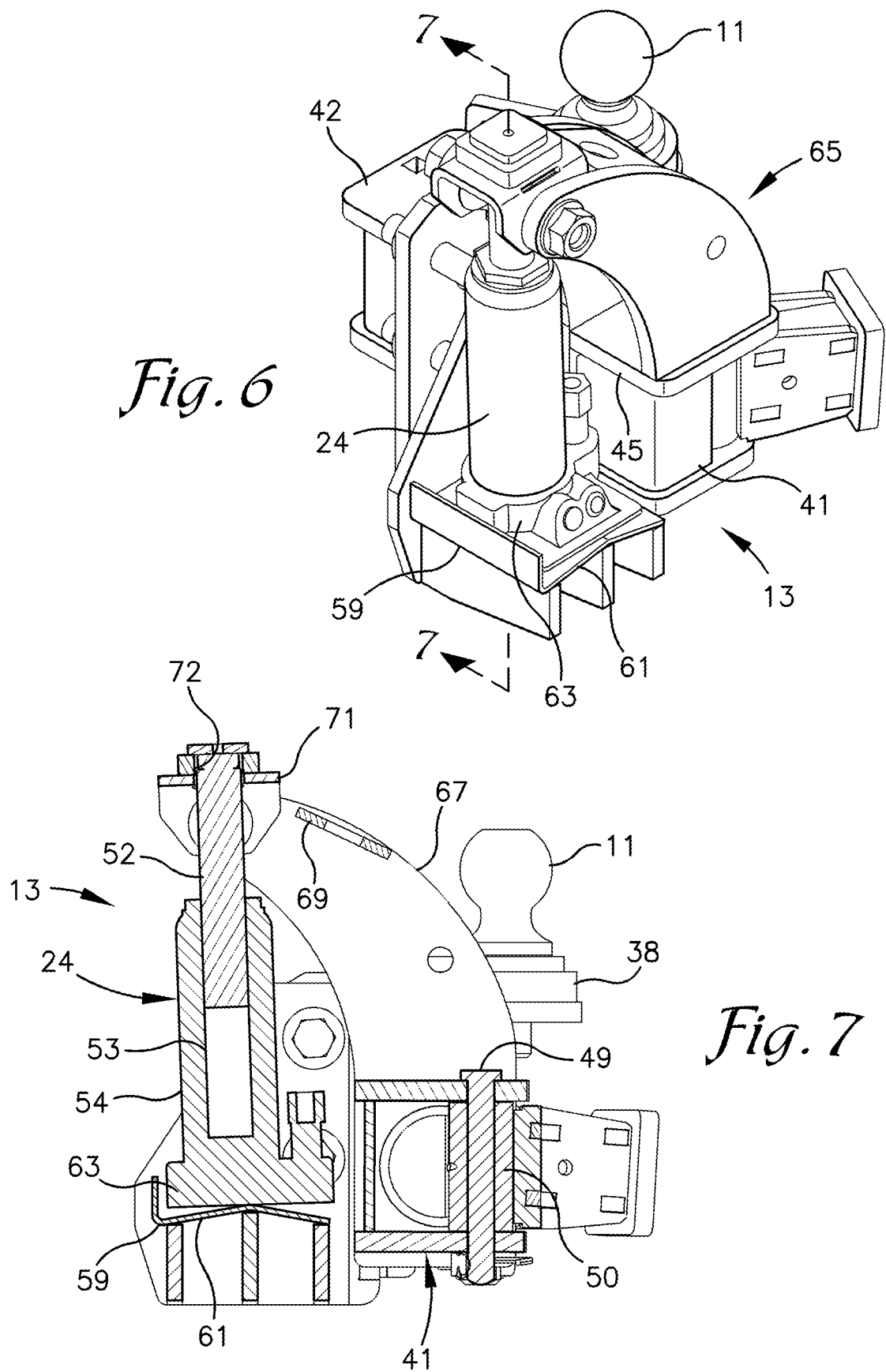

WEIGHT DISTRIBUTING AND SWAY CONTROL HITCH WITH PIVOTING SPRING ARMS FOR LOADING RELATIVE TO SPRING ARM SUPPORTS

CROSS-REFERENCE TO RELATED APPLICATIONS

This application claims the benefit of U.S. Provisional Patent Application No. 62/872,880, filed Jul. 11, 2019, the disclosure of which is hereby incorporated herein in its entirety by reference.

FIELD OF THE INVENTION

The present invention relates generally to weight distributing and sway control trailer hitches.

BACKGROUND OF THE INVENTION

The increased utilization of rear receiver hitches or bumper hitches for towing trailers has increased the demand for weight distributing hitches which are also designed to prevent uncontrolled swaying of the trailer relative to the towing vehicle. Gooseneck or fifth wheel hitches are typically mounted just forward of a rear axle of a pick-up truck and thereby help distribute the load more evenly relative to the towing vehicle. Because rear receiver hitches or bumper hitches are mounted in spaced relation behind the rear axle, the weight of a loaded trailer bearing down on the hitch functions to raise the front end of the vehicle and front wheels relative to the rear wheels which reduces steering control. Swaying of the trailer relative to the towing vehicle also reduces steering control.

Weight distributing hitches incorporating spring arms or bars are known and used to take some of the weight off of the hitch ball of the weight distributing hitch to which the trailer is coupled. The spring arms may also be referred to as deflection bars or beams. In a typical configuration, a first end of each spring arm is connected to a ball mount and a second end of each spring arm is supported, under deflection, on a support surface of a bracket connected to a respective trailer frame. Supporting the spring arm, under deflection, on the support surface creates a moment arm which urges the first end of each spring arm and the ball mount upward to counteract any downward forces imparted on trailer tongue by the weight of the trailer and its load.

The second end of each spring arm preferably is allowed to slide relative to the support surface to accommodate turning of the trailer. In U.S. Pat. No. 6,419,257 of McCoy et al which issued Jul. 16, 2002, the support surface comprises a cam, and a cam follower is formed on the end of each spring arm. Abutment of the cam surfaces of each cam follower against the corresponding cam resists sliding of the spring arm relative to the cam follower unless sufficient force is applied by turning of the towing vehicle relative to the trailer. The resistance prevents or resists swaying of the trailer.

U.S. Pat. No. 6,045,147 of Schmidt et al. shows a lift unit for a weight distributing hitch using a chain connected between the distal end of a respective spring arm and a hook on a chain lift bracket of the lift unit for lifting the distal end of the spring arm relative to a trailer frame. The lift bracket of the lift unit is pivotally connected to a mounting bracket fixedly connected to the trailer frame. With the lift bracket pivoted away from the trailer frame so that the hook extends in a lowered position, the installer pulls up on the chain until it is taught and slips a link of the chain onto the hood of the lift bracket so that the chain remains relatively taught. The installer, uses a lever type tool which can be removably connected to the lift bracket to pivot the lift bracket and the end of the chain connected thereto upward lifting the distal end of the spring arm creating a moment arm on the spring arm to exert an upward force on the opposite, head end of the spring arm. The lift bracket is pivoted to an over-centered position to retain the lift bracket, the chain and the distal end of the spring arm in the raised position. The distal ends of each spring arm are relatively free to move in space, so that this style of hitch provides little if any sway control.

U.S. Pat. No. 7,967,320 of Anderson et al. and U.S. Pat. No. 8,186,702 of McCoy et al. disclose another style of weight distributing and sway control hitch in which the distal end of each spring arm is supported on a support shelf or bracket which is mounted to the trailer frame. For these style hitches, a lever is usually required to lift the spring arms onto the respective support shelf with the desired deflection or load imparted on the spring arm. Use of such levers can require considerable effort and manual force applied to the lever to flex the spring arm onto the support shelf.

U.S. Pat. No. 7,934,742 of Anderson et al. discloses a weight distributing and sway control hitch in which each support shelf or bracket is height adjustable using an actuator or lift connected between a respective support bracket and trailer frame member by a linkage assembly adapted to amplify the movement of the bracket relative to the movement of the actuator. The support bracket can be raised and lowered relative to the spring arm, eliminating the need for use of a lever to lift and flex the spring arm onto the support bracket. The apparatus disclosed in U.S. Pat. No. 7,934,742 of Anderson et al. requires a separate actuator or lift and linkage assembly for each lift arm adding to the overall cost of the assembly.

There remains a need for a weight distributing and sway control hitch that is relatively easy to install and impart the desired load on the spring arms to counteract the downward forces acting on the towing vehicle due to the weight of the trailer and towed item acting on the trailer hitch.

SUMMARY OF THE INVENTION

A weight distributing hitch assembly for towing a trailer behind a towing vehicle is disclosed having spring arms pivotally mounted to a hitch head so that the distal ends of the spring arms may be rotated downward relative to a spring arm support mounted on a side of the trailer for loading the spring arm on the spring arm support. The spring arms are preferably rotated using an actuator connected between the hitch head and at least one of the spring arms for applying a downward rotational force on the spring arm relative to said spring arm support.

In one embodiment, the first and second spring arms are each connected at a first end to a first and second spring arm mount respectively which are mounted on opposite ends of a pivot shaft which is rotatably coupled to the hitch head and extends laterally relative to the hitch head. The actuator is connected between a support structure on the hitch head and a lever arm connected to one of the spring arm mounts. The actuator may be a hydraulic type actuator including for example a manually operable bottle jack.

BRIEF DESCRIPTION OF THE DRAWINGS

FIG. 6 is an enlarged, left front perspective view of the hitch head with portions broken away to show detail and including a jack for loading the spring arms relative to support shelves mountable on frame members of the trailer.

FIG. 7 is a cross-sectional view of the hitch head taken along line 7-7 of FIG. 3.

DETAILED DESCRIPTION OF THE PREFERRED EMBODIMENTS

Figure 1:
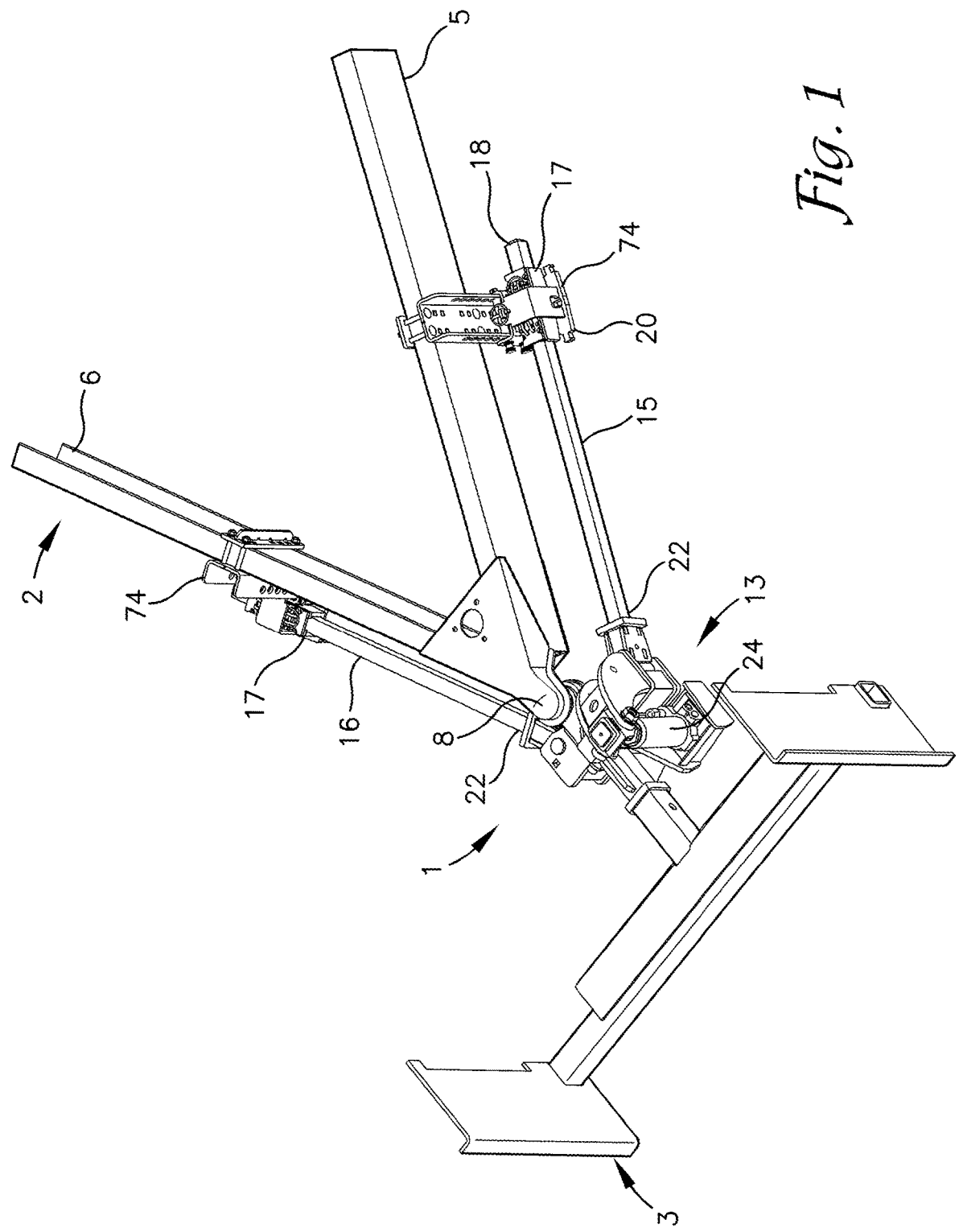
FIG. 1 is a left, front, perspective view of a weight distributing hitch including a hitch head and left and right spring arms for connecting a trailer to a vehicle, fragmentary portions of which are shown.
Figure 2:
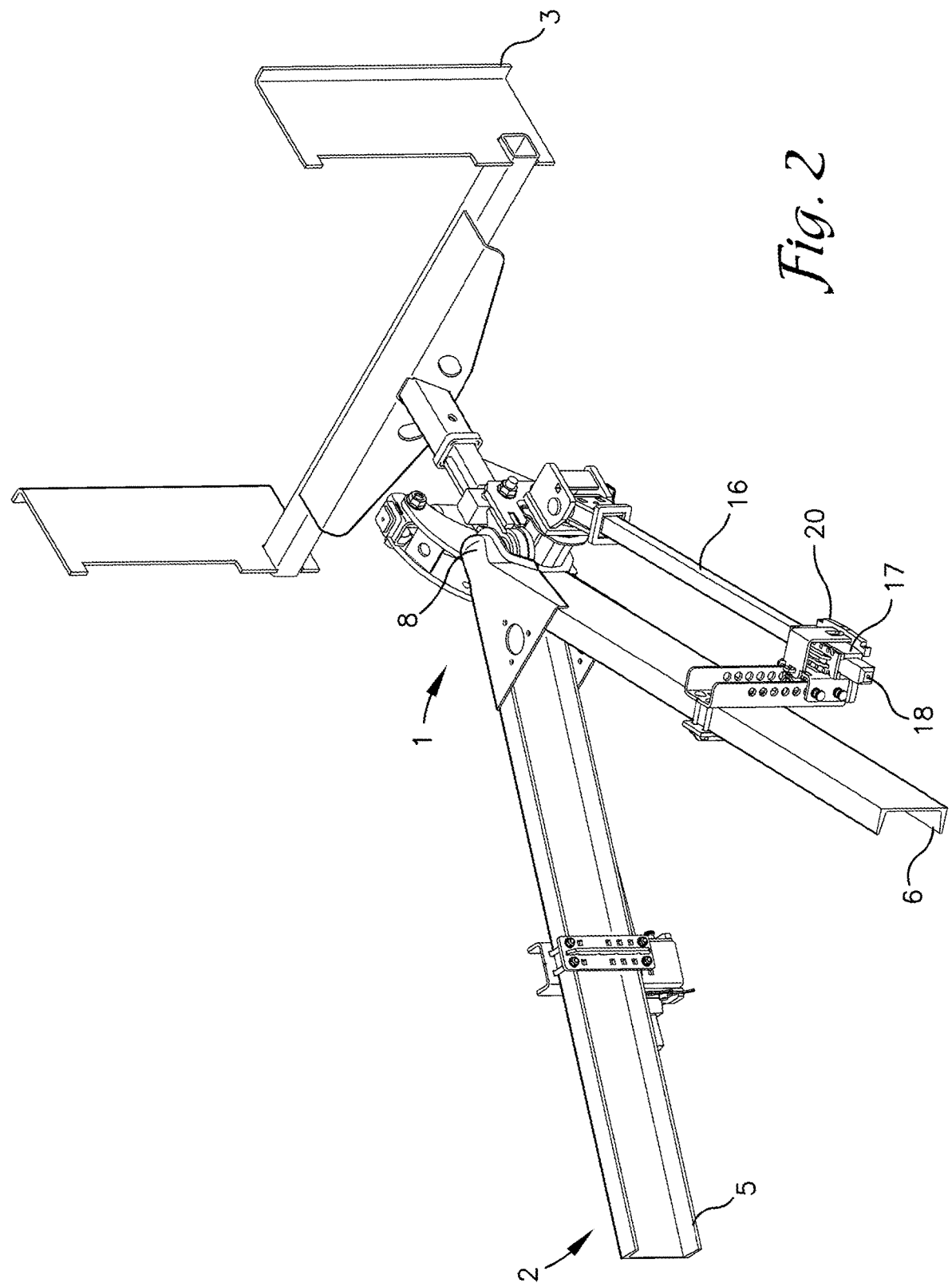
FIG. 2 is a rear perspective view of the weight distributing hitch as shown in FIG. 1.
Figure 3:
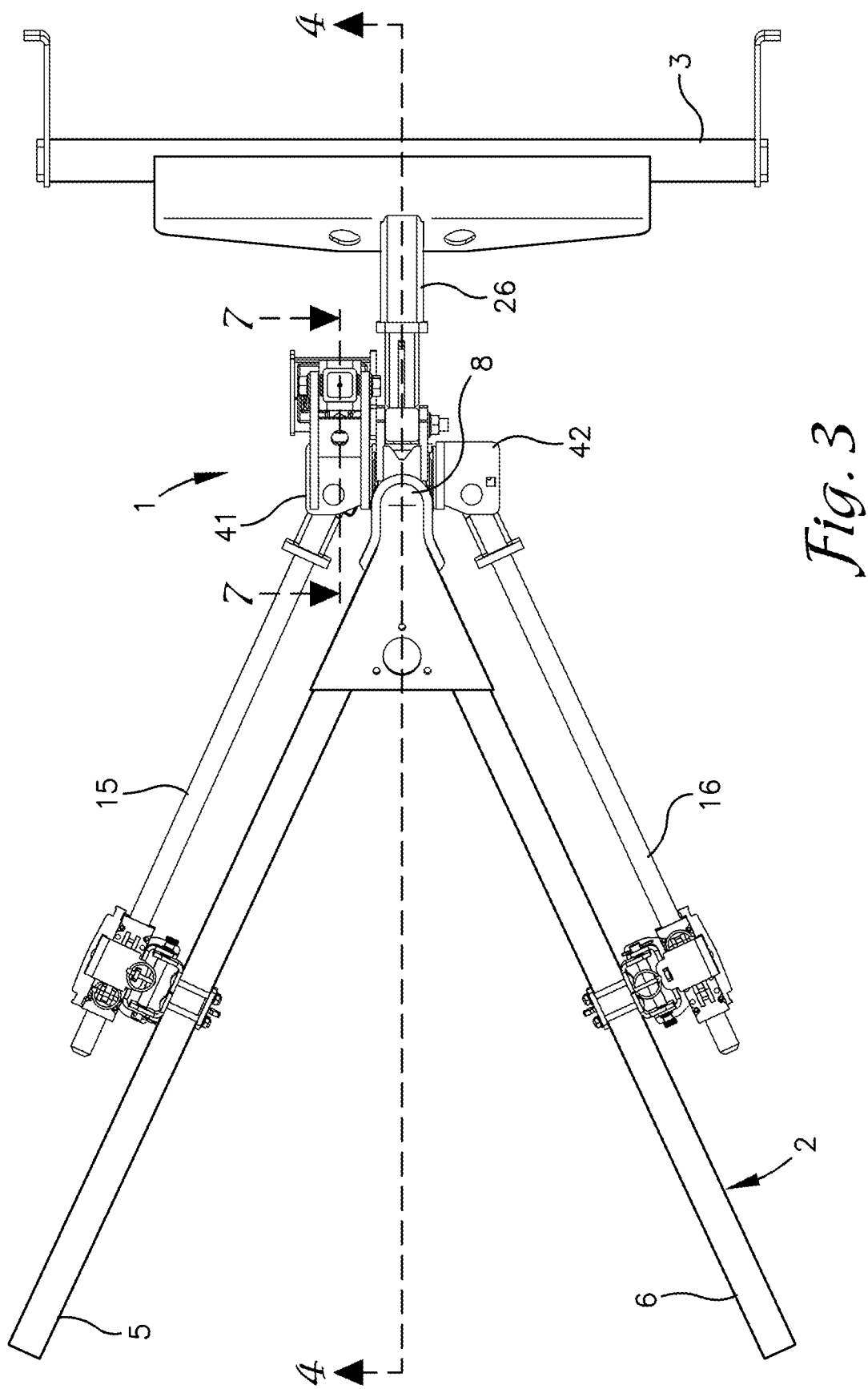
FIG. 3 is a top plan view of the weight distributing hitch as in FIG. 1.
Figure 4:
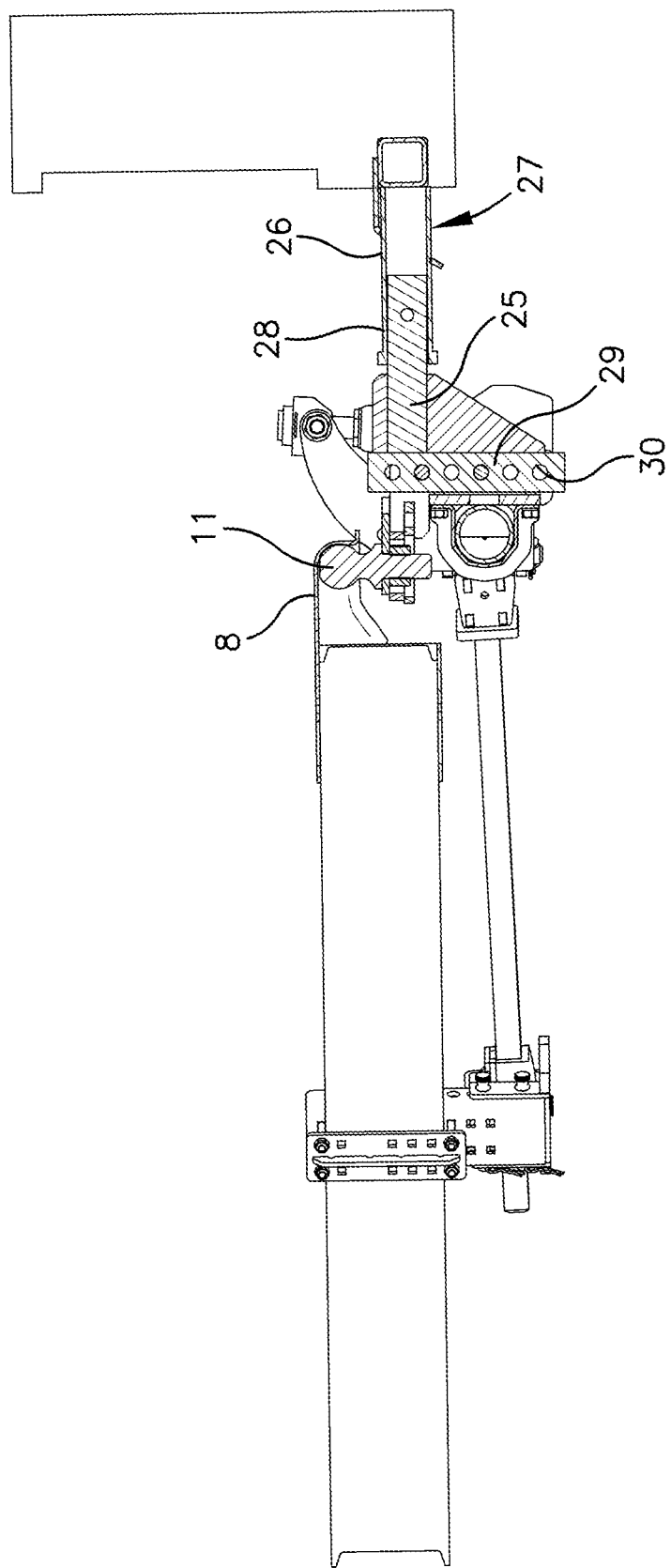
FIG. 4 is a cross-sectional view of the weight distributing hitch taken along line 4-4 of FIG. 3.
Figure 5:
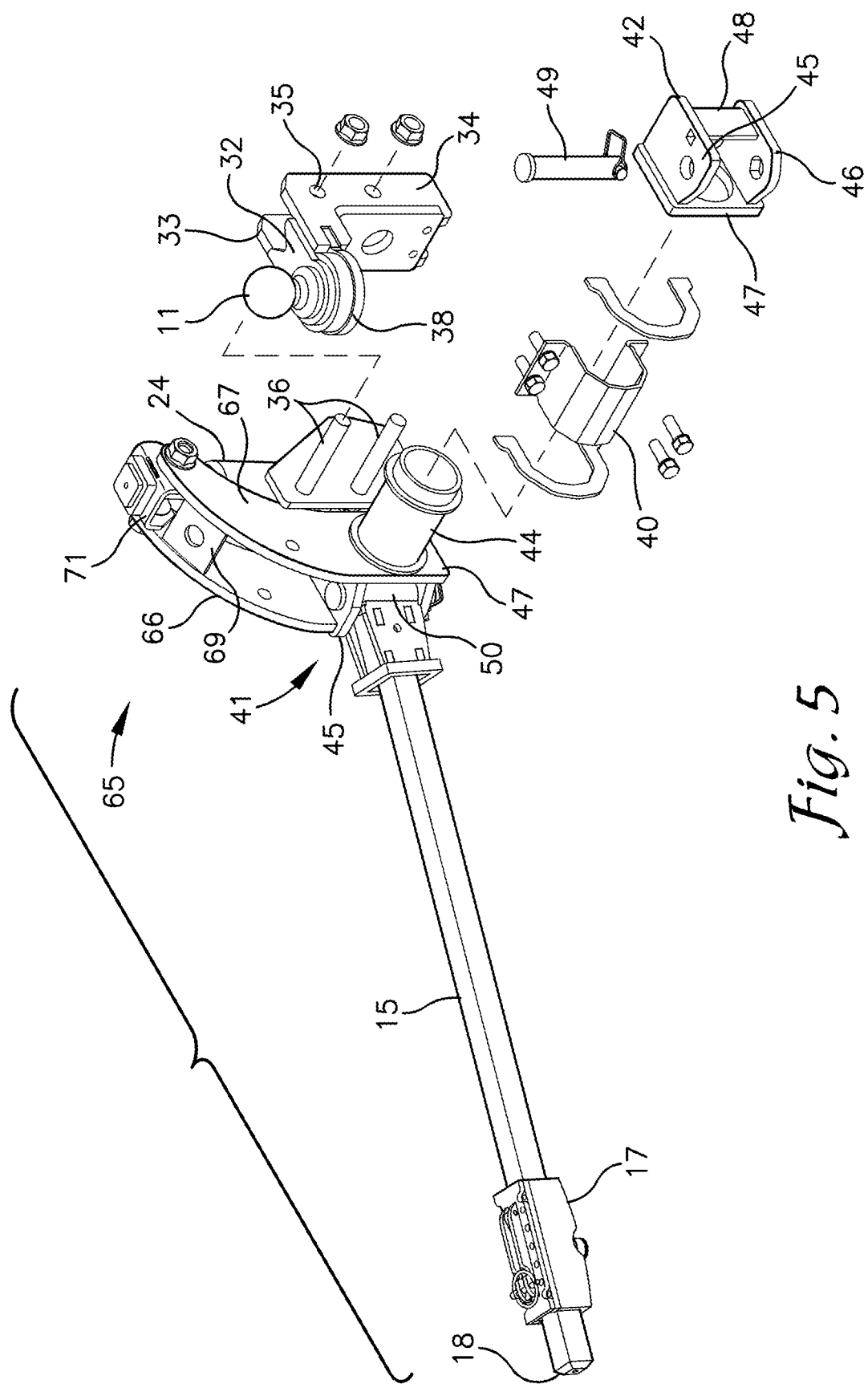
FIG. 5 is an enlarged and exploded, rear perspective view of the weight distributing hitch.
Figure 8:
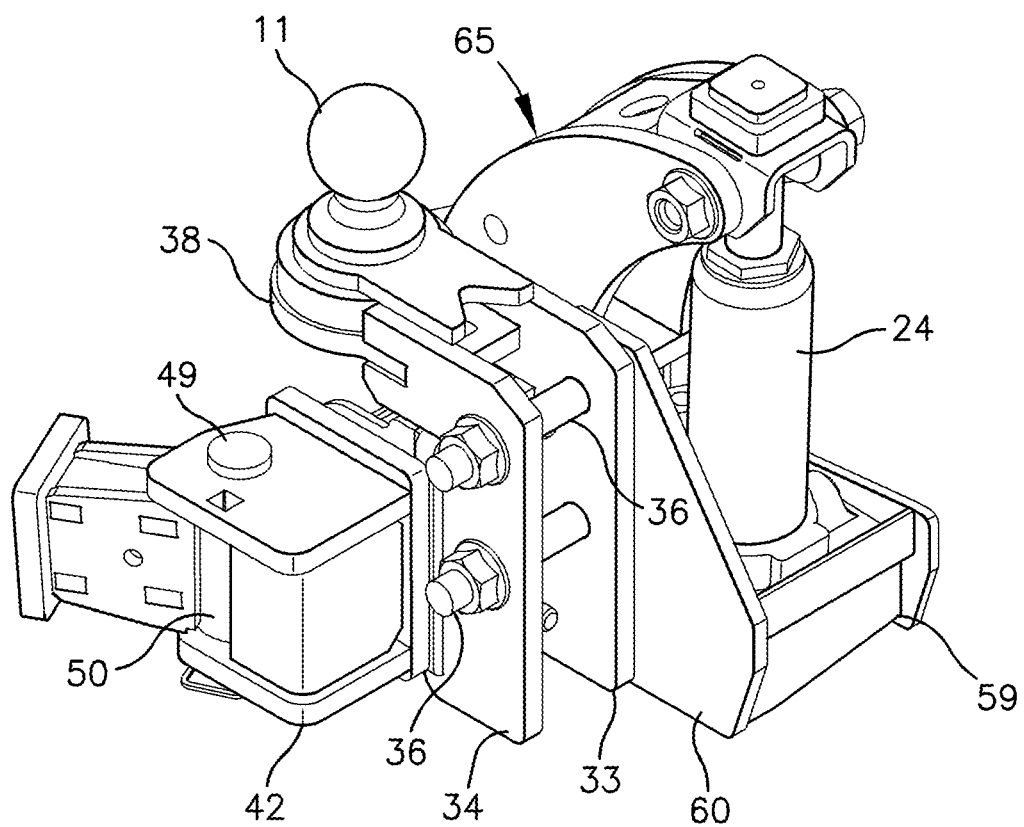
FIG. 8 is an enlarged, right, front perspective view of the hitch head.
Figure 9:
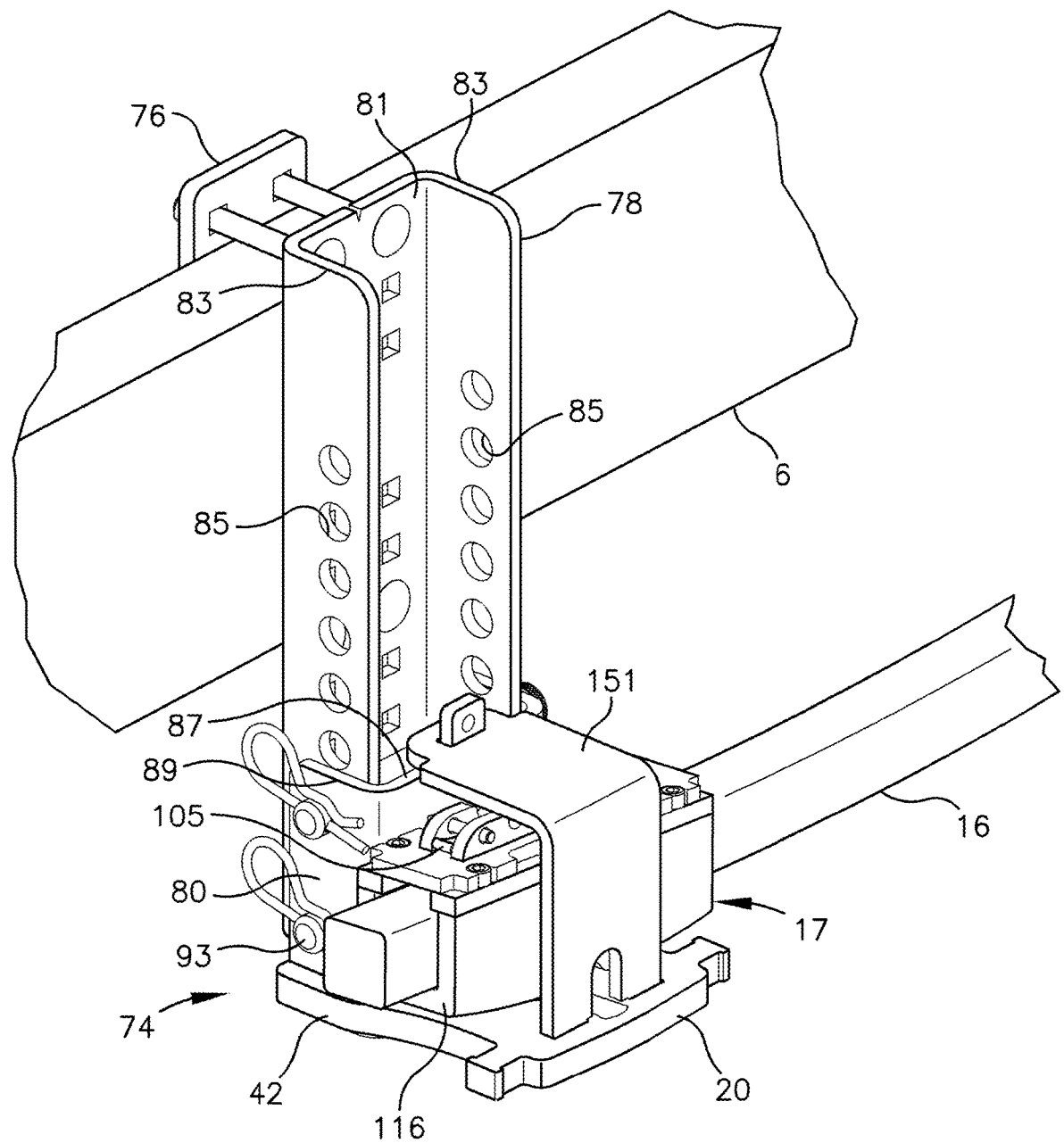
FIG. 9 is an enlarged and fragmentary perspective view of the weight distributing hitch showing an adjustable slide block mounted proximate a distal end of one of the spring arms supported on a support shelf mounted on one of the trailer frame members.
Figure 10:
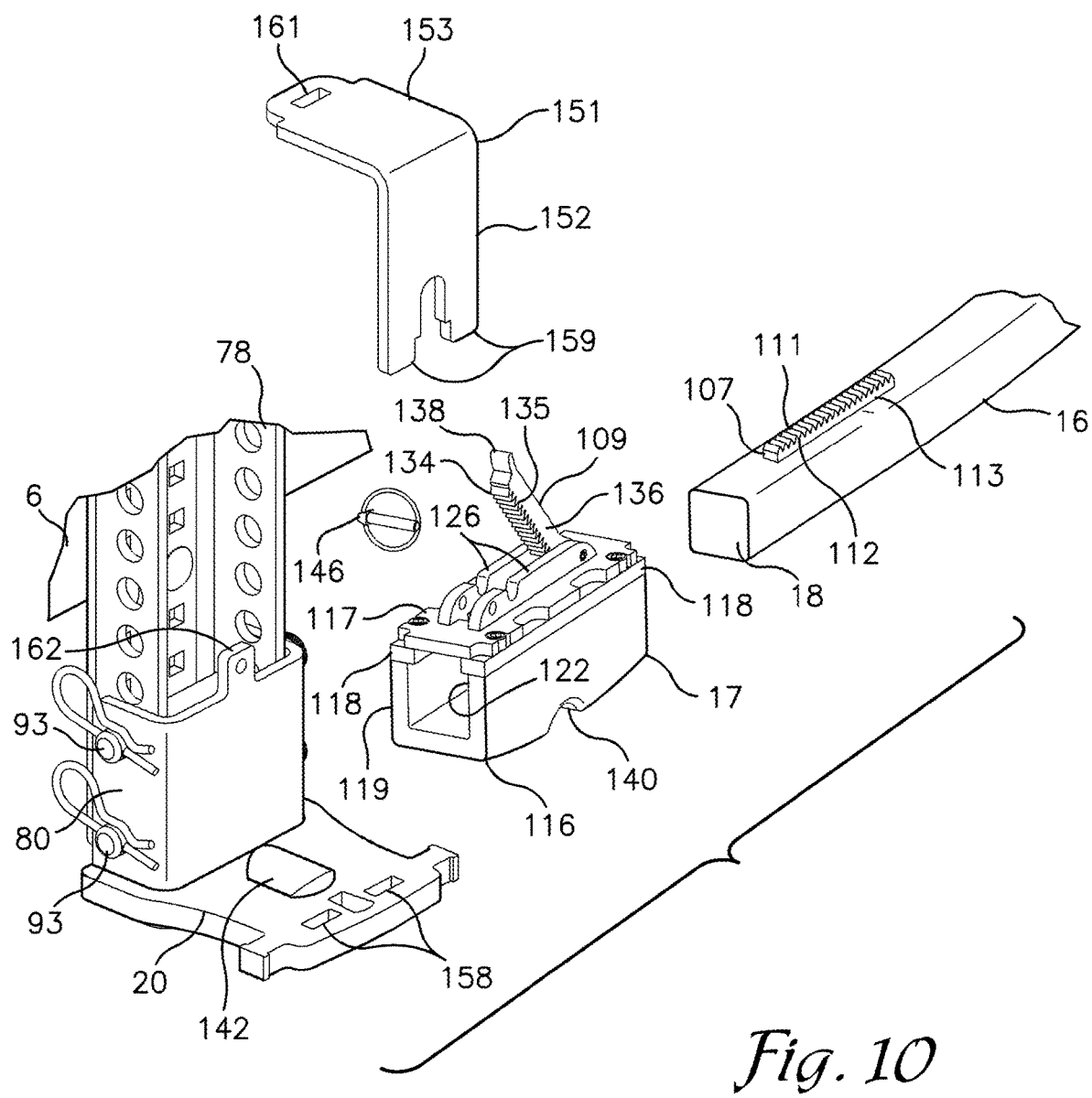
FIG. 10 is an exploded and fragmentary perspective view of the weight distributing hitch as shown in FIG. 12 showing additional details of the adjustable slide block and the support shelf.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Referring to the drawings, a weight distributing hitch assembly 1 is shown which is used to connect a trailer 2 to a towing vehicle 3. The trailer 2 is typically of the type having two frame members or frame rails 5 and 6 connected to and extending rearward from a coupler 8. The coupler 8 is removably securable to a hitch ball 11 connected to the towing vehicle 3. As used herein, directional references are generally made with respect to an operator or driver of the towing vehicle 3, with the left and right sides corresponding to the left and right sides of a driver sitting in a driver's seat of the towing vehicle. Front or forward refer to the direction extending toward the front of the towing vehicle 3 and rear or rearward referring to the direction extending toward the rear of the towing vehicle 2 and trailer 3.

In the embodiment of the weight distributing hitch 1 shown, the hitch ball 11 is connected to a ball mount 12 which forms part of a hitch head 13 which also includes a spring arm pivot assembly 14 connected to the ball mount 12. A pair of spring arms or torsion bars 15 and 16 are connected to and extend rearwardly from the spring arm pivot assembly 14. In the embodiment shown an adjustable slide block 17 is mounted on each spring arm 15 and 16 near a distal end 18 thereof. The distal end 18 of each spring arm 15 and 16 may be raised relative to a spring arm support or support shelf 20 on respective trailer frame rails 5 and 6 to position the adjustable slide block 17 on the respective support shelf 20. In the embodiment shown, the position of each adjustable slide block 17 along a respective spring arm 15 or 16 is adjustable longitudinally to position the slide block 17 in alignment with the support shelf 20 on which it is to be supported.

Forward ends 22 of each spring arm 15 and 16 are pivotally mounted relative to the hitch head 13 to pivot in unison about a horizontal axis extending transverse to a longitudinal axis through the weight distributing hitch 1. An actuator or jack 24, operably connected between the spring arm pivot assembly 14 of the hitch head 13 and at least one of the spring arms 15 or 16, is operable to pivot the spring arms 15 and 16 in unison relative to the hitch head 13. A downward force or load may be applied to the adjustable slide blocks 17 on the support shelves 20 by pivoting of the distal ends 18 of each spring arm 15 and 16 downward by rearward and downward pivoting of the forward ends 22 of spring arms 15 and 16.

The hitch head 13 is removably connected to a drop bar assembly 25 which is removably secureable within a receiver 26 of a receiver hitch 27 mounted on the rear of the towing vehicle 3. The drop bar assembly 25 includes a shank 28 which is slidably secureable within the receiver 26 and a drop bar 29 with a plurality of holes 30 extending side to side through the drop bar 29.

The ball mount 12 of the hitch head 13 shown includes a ball support platform 32 supported between and projecting rearward from vertical flange plates 33 and 34 at upper ends thereof. Vertically aligned sets of mounting holes 35 are formed in the flange plates 33 and 34 for selectively securing the ball mount head 13 at one of a plurality of selected heights relative to the drop bar 29. Mounting pins 36 insertable in aligned mounting holes 35 and 30 in the flange plates 33 and 34 and drop bar 29 respectively are used to fix the vertical position of the hitch head 13 relative to the drop bar 29. The hitch ball 11 is secured to and projects upward from a rearward projecting portion or mounting portion 38 of the ball support platform 32 of ball mount 12.

A pivot shaft bearing 39 is mounted on a bearing support plate 40 connected to and extending between or across rearward edges of the vertical flange plates 33 and 34 and below the ball support platform 32. First and second or left and right spring arm mounts 41 and 42 are fixedly connected to a pivot shaft 44 on opposite ends thereof and the pivot shaft 44 is pivotally or rotatably secured within the pivot shaft bearing 39 to pivot about a horizontal axis extending horizontally and perpendicular to the shank 20 of the drop bar 21 when the hitch head 13 is secured thereto. Because the left and right spring arm mounts 41 and 42 are fixedly connected to the pivot shaft 44, pivoting of the left spring arm mount 41 results in simultaneous pivoting of the right spring arm mount 42.

In the embodiment shown, the left and right spring arm mounts 41 and 42 are generally formed as a clevis, with upper and lower pivot pin support plates 45 and 46 secured to and projecting laterally outward from a flange plate 47 secured to and extending radially outward from each end of the pivot shaft 44. A vertical support 48 may be welded between each pair of upper and lower pivot pin support plates 45 and 46 along the front edges of the support plates 45 and 46 and along a side thereof opposite the respective flange plate 47. Each spring arm mount 41 and 42 is open along its rear face or edge. A pivot pin 49 may be inserted through vertically aligned holes in each pair of upper and lower pivot pin support plates 45 and 46. The pivot pin 49 preferably has an enlarged head and a shaft that is longer than the distance between outer surfaces of the upper and lower pivot pin support plates 45 and 46 with a bore in a lower end of the pivot pin 49 to receive a cotter pin or the like for holding the pivot pin 49 in place.

A spring arm pivot bearing 50 is secured on the forward end of each spring arm 15 and 16. The pivot bearings 50 of each spring arm 15 and 16 are pivotally secured about the vertically extending pivot pin 49 secured to each spring arm mount 41 and 42 between the upper and lower pivot pin support plates 45 and 46. Pivoting of the pivot bearing 50 about a respective pivot pin 49 allows for pivoting of the spring arms 15 and 16 inward or outward about an axis extending generally vertically through the respective spring arm mounts 41 and 42. When a trailer 2 is secured to the hitch head 13 secured to a towing vehicle 3, the spring arms 15 and 16 generally extend rearwardly along the outer sides of the trailer frame members 5 and 6 respectively so that the distal end 18 of each spring arm 15 and 16 with an adjustable slide block 17 secured thereto may be selectively supported on the support shelf 20 connected to the trailer frame member 5 or 6.

The jack 24 may be a conventional bottle type hydraulic jack including a piston 52 mounted within a cylinder 53 which in turn is mounted within a larger reservoir or cannister 54 surrounding the cylinder 53. A manual pump 56 (not shown) is flow connected between the cannister 54 and cylinder 53 for manually pumping hydraulic fluid from the cannister 54 into the cylinder 53 to extend the piston 52. A manually operable bypass (not shown) is incorporated into the jack 24, and selectively operable to allow fluid to drain from the cylinder 54 back into the cannister 54 to allow the piston 52 to retract within the cylinder 53. A handle socket (not shown) is operably connected to the pump 56 and receives a rod or bar (not shown) to manually operate the pump and extend the piston 52.

The jack 24 is supported at a lower end on a jack support platform or base 59 connected to and projecting laterally outward from a lower end of a mounting plate 60 which is securable to one of the vertical flange plates, the left vertical flange plate 33 in the embodiment shown, of the ball mount 12. Mounting pins 36 may be inserted through holes formed in the mounting plate 60 which align with mounting holes 35 in the vertical flange plates 33 and 34 to secure the mounting plate 60 and support platform 59 to the ball mount 12 and to secure the ball mount 12 and spring arm pivot assembly 14 to the drop bar 29.

In the embodiment shown, the support platform 59 includes a floor 61 which is formed as a laterally extending ridge. When a bottom 63 of the jack 24 is positioned on the ridged floor 61 of the floor support platform 59, the jack 24 can pivot or toggle rearward upon extension of the piston 52 or forward upon retraction of the piston 52 as discussed hereafter. It is to be understood that the lower end of the jack 24, or other actuator, could be pivotally connected to the support platform 59. For example, a modified jack could be pivotally connected to the support platform 59 by a pin extending through an eyelet in the bottom of the jack. The support platform 59 is connected to the ball mount 12 so that it supports the bottom of the jack 24 forward of the pivot axis of the spring arm mounts 41 and 42 and the spring arms 15 and 16.

A lever arm assembly 65 is connected to and projects upward and forward from the upper pivot pin support plate 45 of one of the spring arm mounts, the left spring arm mount 41 in the embodiment shown. The lever arm assembly 65 shown is formed from two lever arm plates 66 and 67 extending upward and curving forward from the upper pivot pin support plate 45 of the left spring arm mount 41 on opposite sides thereof. A lateral support or brace 69 is welded between the lever arm plates 66 and 67. A piston engaging shoe or bracket 71 is pivotally mounted between the upper and forwardly projecting ends of the lever arm plates 66 and 67. With the piston 52 of jack 24 fully retracted, the jack 24 may be positioned or set on the jack support platform 59 with the upper end of the piston 52 extending below the piston engaging shoe. 71. The jack 24 is operable using the pump to raise the piston 52 until its upper end engages an underside of the shoe 71. A piston receiver 72 is formed in or on the shoe 71 and opens downward to receive the upper end of the piston 52 which seats therein. It is foreseen that the upper end of the piston may be pinned or otherwise secured to the pivoting bracket or shoe 71 or pivotally pinned to the upper and forward ends of the lever arm plates 66 and 67 without the shoe 71.

With the jack 24 positioned on the support platform 59, forward of the pivot axis of pivot shaft 44, once the upper end of the piston 52 abuts against the shoe 71 and is received in the piston receiver 72, further extension of the piston 52 through operation of the pump lifts the forward distal end of the lever arm assembly 65 causing the lever arm assembly 65 to rotate the left spring arm mount 41, the pivot shaft 44 and the interconnected right spring arm mount 42 downward and rearward which then rotates the spring arms 15 and 16 connected to the left and right spring arm mounts 41 and 42 downward and rearward. When the distal ends of the spring arms 15 and 16 are supported on support shelves 20 on frame members 5 and 6, downward pivoting of the spring arms 15 and 16 imparts a load on the spring arms 15 and 16 acting upward on the hitch head 13 through the spring arm mounts 41 and 42.

Fully retracting the piston 52 within the cylinder 53 within the cannister or bottle 54, takes the load off of the spring arms 15 and 16 supported by shelves 20 and allows the spring arms 15 and 16 to be lifted upwards off of the shelves 20, then pivoted outward about pivot pins 49 and then downward off of the shelf 20 to permit adjustment to the height of the shelves 20 or other spring arm support or, in the embodiment shown, to adjust the position of the adjustable slide blocks 17 on the spring arms 15 and 16. Once adjustments are made, and with the piston 52 of jack 24 still retracted, the spring arms 15 and 16 may be pivoted outward, raised just above the shelves 20, pivoted inward over the shelves 20 and then lowered slightly such that the adjustable slide blocks 17 rest of the shelves 20 in a selected alignment. The piston 52 of the jack 24 may then be extended, using the pump, to pivot the spring arms 15 and 16 downward to apply a load to the spring arms 15 and 16 supported on the shelves 20.

In the embodiment shown in FIGS. 1-8, the spring arm pivot assembly 14 includes the pivot shaft 44, the spring arm mounts 41 and 42, lever arm assembly 65. The pivot shaft 44, spring arm mounts 41 and 42 and lever arm assembly 65 are pivotally connected to the ball mount 12 by the pivot bearing 39. The jack support platform 59 is connected to the ball mount 12 using the pins 36 and the jack 24 supported on the support platform 59 and connected to the lever arm assembly 65 operably connects the spring arm pivot assembly 14 to the ball mount 12 to permit pivoting of the spring arm pivot assembly 14 relative to the ball mount 12.

As best seen in FIGS. 9-12, the support shelves 20 are each part of a spring arm support assembly 74 connected to each trailer frame member 5 and 6. Each spring arm support assembly 74 includes a back plate 76, a vertically oriented support bracket or trailer frame mount 78 and a mounting bracket 80 fixedly connected to or formed as part of the support shelf 20. Each support bracket 78 is generally U-shaped, including a central web 81 and laterally projecting legs 83 extending transverse to the central web 81 on opposite sides thereof. A plurality of pin receiving holes 85 are formed in each leg 83 in vertical and equally spaced alignment. Each support bracket 78 is connected to a respective trailer frame member 5 or 6 by bolting it to a back plate 76 with the frame member 5 or 6 sandwiched therebetween and with the legs 83 of each support bracket 78 projecting transverse to and outward from the frame member 5 or 6 to which it is connected.

The mounting bracket 80 for each support shelf 20 extends transverse to the support shelf 20 and in the embodiment shown extends vertically above the support shelf 20 and on one side thereof. The mounting bracket 80 is also generally U-shaped with a central web 87 and legs 89 extending transverse to the central web 87 and generally away from the support shelf 20. A pair of vertically aligned, pin receiving holes (not shown) are formed in each leg 89 of the mounting bracket 80. In the embodiment shown, the legs 89 of mounting bracket 80 are spaced just wider than the legs 83 of support bracket 78. The legs 89 of mounting bracket 80 may be placed in overlapping relationship with legs 83 of support bracket 78 and then pins 93 may be inserted through aligned pin receiving holes 91 and 85 therein to selectively secure the mounting bracket 80 and support shelf 20 to the support bracket 78 at any one of a plurality of fixed heights relative to the support bracket 78. The mounting bracket 80 is secured to the support bracket 78 so that the support shelf 20 projects laterally or horizontally outward from the mounting bracket 78, the support bracket 78 and the associated frame member 5 or 6 when the frame member 5 or 6 is supported in a horizontal alignment.

As best seen in FIGS. 9-12, each adjustable slide block 17 is slid over the distal end of a respective spring arm 15 and 16 and then selectively secured in place on the spring arm 15 or 16 by securement means, which may be set screws or in the embodiment shown comprises a toothed latch assembly 105. The toothed latch assembly 105 includes a latch base 107 welded or otherwise secured or formed on an upper surface of each spring arm 15 and 16 and a pivoting latch member 109 which is pivotally connected to the adjustable slide block 17.

The latch base 107 may be formed from a toothed, rectangular strip of metal in the nature of a straight, rack gear. The latch base 107 shown includes a plurality of teeth 111 spaced apart by grooves or recesses 112 formed in a latch base body 113 in equally spaced relationship across an upper surface of the latch base body 113. A latch base 107 is welded or otherwise secured to an upper surface of each of the spring arms 15 and 16 proximate a distal end thereof and with the teeth 111 and recesses 112 extending or opening upward and transverse to a longitudinal axis of the spring arm 15 or 16 to which it is secured.

The adjustable slide block 17 is formed from a U-shaped base 116, a top plate 117 and a pair of spacers 118 positioned between the top plate 117 and upper ends of sidewalls 119 of the U-shaped base 116 with a passageway 122 extending longitudinally through the block 17. The passageway 122 is sized taller than and slightly wider than the spring arms 15 and 16 to allow one of the blocks 17 to be slid onto the end of each spring arm 15 and 16. The passageway 122 in each slide block 17 is taller than the height of the spring arms and tall enough to allow a spring arm 15 or 16 with a latch base 107 secured thereto to pass through the passageway 122. A slot 124 is formed in and extends longitudinally through the top plate 117 and opens into the passageway 122. Pivot mounts 126 are formed on an upper surface of the top plate 117 and extend longitudinally adjacent the slot 124 on each side thereof. A pivot pin receiving bore 128 is formed in and extends transversely through each of the pivot mounts 126 proximate a first end thereof and a lock pin receiving bore 130 is formed in and extends transversely through each of the pivot mounts 126 proximate a second end thereof.

The latch member 109 is pivotally mounted to the pivot mounts 126 using pivot pin 132 extending through the pivot pin receiving bores 128 in the pivot mounts 126 and through an aligned pivot pin receiving bore (not shown) in the latch member 109. The latch member 109 is formed from a toothed, rectangular strip of metal in the nature of a straight, rack gear. The latch member 109 shown includes a plurality of teeth 134 spaced apart by grooves or recesses 135 formed in a latch member body 136 in equally spaced relationship across a lower surface of the latch member body 136. The spacing between teeth 134 in the latch member body 136 corresponds to the spacing between the teeth 111 of the latch base body 113 such that the teeth 111 and 134 intermesh when the latch member 109 is positioned over the latch base 107.

The latch member 109 is pivotally mounted to the pivot mounts 126 so that it can be pivoted to extend across the slot 124 in top plate 117 with the teeth 134 extending downward into the passageway 122. A finger grip or tab 138 is formed on and projects forward from the latch member body 136 on an end of the latch member body 136 opposite the pivot pin 132. The tab 138 may be grasped by a user to pivotally raise or lower the latch member 109 about pivot pin 132 and relative to slot 124. When the latch member 109 is pivoted downward, across the slot 132, the tab 138 extends past the distal end of the slot 132 and over the top plate 117 to prevent further downward pivoting of the latch member 109 relative to the slot 132.

Figure 11:
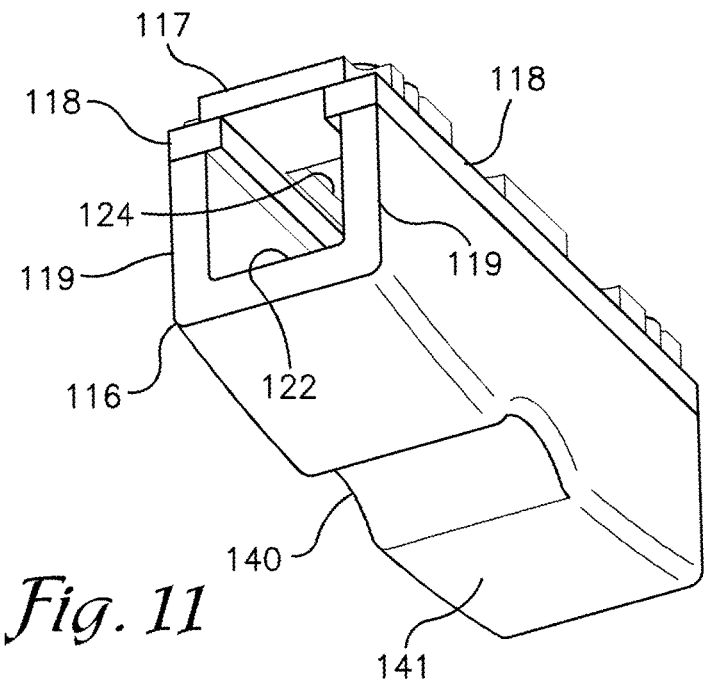
FIG. 11 is an enlarged, bottom perspective view of the adjustable slide block with a transverse projection receiving groove formed in a bottom of the block.

As best seen in FIG. 11, a transverse groove 140 is formed in a floor or bottom 141 of the block 17 and U-shaped base 116. The groove 140 is sized to receive a semi-cylindrical projection 142 formed on an upper surface of either shelf 20 when the block 17 and spring arm 15 or 16 are supported on the shelf 20.

The adjustable slide blocks 17 are positioned and secured on the spring arms 15 and 16 so that when the spring arms 15 and 16 and blocks 17 are loaded onto a respective support shelf 20, the transverse groove 140 is aligned with and receives the semi-cylindrical projection 142 on the support shelf 20. More specifically, prior to loading the adjustable slide blocks 17 and spring arms 20 onto the respective support shelves 20, the toothed latch assembly 105 associated with a respective block 17 is released so that the block 20 is free to slide longitudinally relative to the spring arm 15 or 16 on which it is mounted. The adjustable slide blocks 17 are generally positioned longitudinally relative to the respective spring arm 15 and 16 so that groove 140 in each block 17 is approximately aligned with the projection 142 on the associated support shelf 20. When the block 17 and spring arm 15 or 16 are loaded onto the support shelf 20, the block 17 can slide relative to the spring arm 15 or 16 to self-align the groove 140 in block 17 over projection 142.

With the block 17 centered over the projection 142, the latch member 109 is pivoted downward to advance the latch member teeth 134 into the aligned grooves 112 in the latch base 107 and the teeth 111 in the latch base into the grooves in the latch member 109. A lock pin 144 can then be inserted through the lock pin receiving bores 130 in the pivot mounts 126 and above an upper surface of the latch member 109 to secure the latch member 109 in engagement with the latch base 107 and thereby fix the longitudinal alignment of the slide block 17 relative to the spring arm 15 or 16. A recess 145 is formed in each of the pivot mounts 126 proximate the lock pin receiving bores 130 to receive a segment of a lock pin ring 146.

A removable retainer bracket 151 is provided and may be connected between an outer edge of the shelf 20 and an upper edge of the mounting bracket 80 and over the block 17 positioned on shelf 20. The retainer bracket 151 is generally L-shaped with a vertical leg 152 and horizontal leg 153. A pair of slots 158 are formed in and extend proximate and parallel to the outer edge of the shelf 20 and are adapted to receive tabs or feet 159 projecting downward from the vertical leg 152 of retaining bracket 151. A tab receiving slot 161 is formed in a distal end of horizontal leg 153 and sized to matingly receive a tab 162 projecting upward from the upper edge of the mounting bracket web 87. A hole is formed in the tab 162 for receiving a locking pin (not shown) to secure the retainer bracket 151 to the mounting bracket 80 over and around the block 17.

After the adjustable slide block 17 attached to each spring arm 15 and 16 is loaded onto a respective shelf 20 and seated on the associated projection 142 on each shelf 20, and a retainer bracket 151 is secured over each adjustable slide block 17, the jack 24 may be operated to pivot the distal ends of the spring arms 15 and 16 downward relative to the support shelves 20 which creates a load on the spring arms 15 and 16. The downward loading of the spring arms, 15 and 16 against the support shelves 20 creates an opposite, upwardly exerted force on the hitch ball head 13 to counteract any downward loading on the hitch ball 11 from the trailer.

The downward force exerted on the distal end of each spring arm and on the respective adjustable slide block 17 against the shelf 20 also functions to hold or seat the semi-cylindrical projection 142 on each shelf 20 in mating alignment within the transverse groove 140 in the block 17. Abutment of the projection 142 against the portions of the block 17 surrounding the transverse groove 140 in which the projection 142 is received, resists sliding of the block 17 and the spring arms 15 and 16 relative to the associated shelf 20.

With the spring arms 15 and 16 and the adjustable slide blocks 17 secured thereto loaded onto the support shelves 20 and the projections 142 on each shelf 20 received in the transverse groove 140 of the respective block 17, the blocks 17 and spring arm 15 and 16 are restrained from sliding relative to the support shelves 20 which prevents uncontrolled swaying of the trailer 2 relative to the towing vehicle 3. When the towing vehicle 3 turns relative the trailer 2, the force directed longitudinally through the spring arm 15 or 16, on the side of the trailer 2 to which the vehicle turns, is sufficient to force the block 17 over the projection 142 so that the spring arm 15 or 16 and block 17 slide rearward relative to the shelf 20. At the same time, the longitudinal force drawn through the spring arm 15 or 16 on the opposite side draws the associated slide block 17 over and past the projection 142 so that the spring arm 15 or 16 and block 17 slide forward relative to the opposite shelf 20. The retaining bracket 151 prevents the deflection bar 32 and slide block 65 from coming off of the support shelf 42.

Unloading of the slide blocks 17 and spring arms 15 and 16 from the shelves 20 allows adjustment of the position of the slide block 17 relative to a respective spring arm 15 or 16 to adjust the weight distributing hitch 1 to counteract different loads supported on the trailer 2. As the load or weight supported on the trailer 2 increases, the counter acting deflection imparted on the spring arms 15 and 16 is increased by raising the mounted position of the shelves 20 and associated mounting brackets 80 relative to their respective support brackets 78. By raising the shelves 20 the extent of the load which can be imparted through the spring arms 15 and 16 by pivoting them downward against the shelves can be increased. Repositioning of the shelves 20 will require repositioning of the slide blocks 17 on the spring arms 15 and 16 to ensure alignment of the transverse groove 140 in each slide block 17 with the projection 142 on the shelf 20 whose position has been adjusted.

Figure 12:
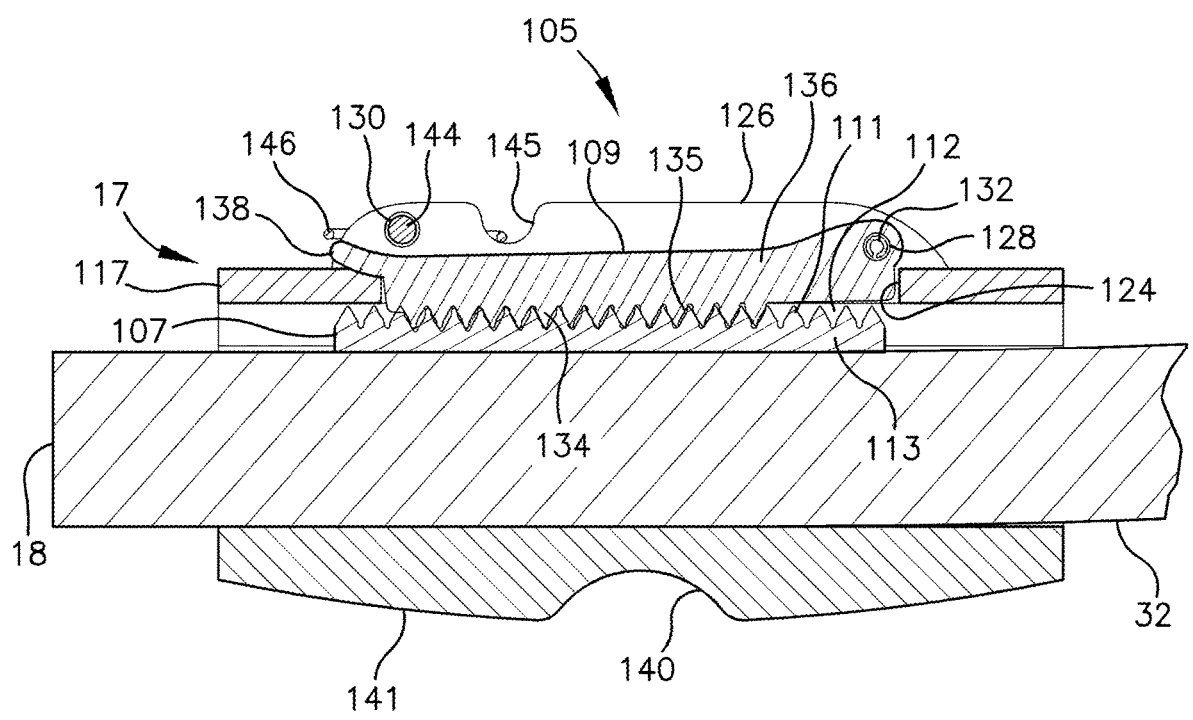
FIG. 12 is a fragmentary cross-sectional view showing the adjustable slide block and a latching assembly for the slide block secured to one of the spring arms.
Figure 13:
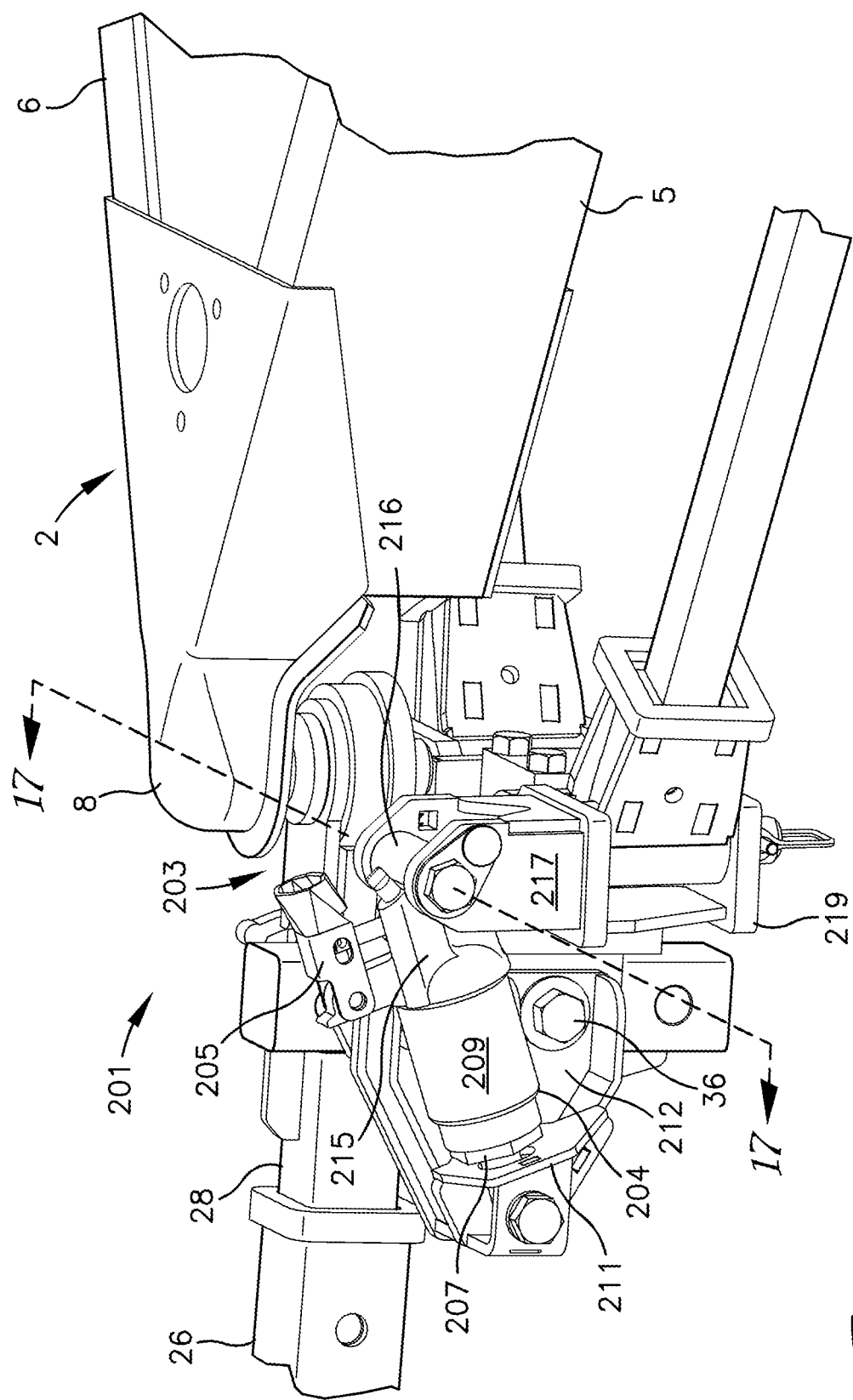
FIG. 13 is a fragmentary, left side perspective view of an alternative embodiment of the weight distributing hitch with a modified hitch head.
Figure 14:
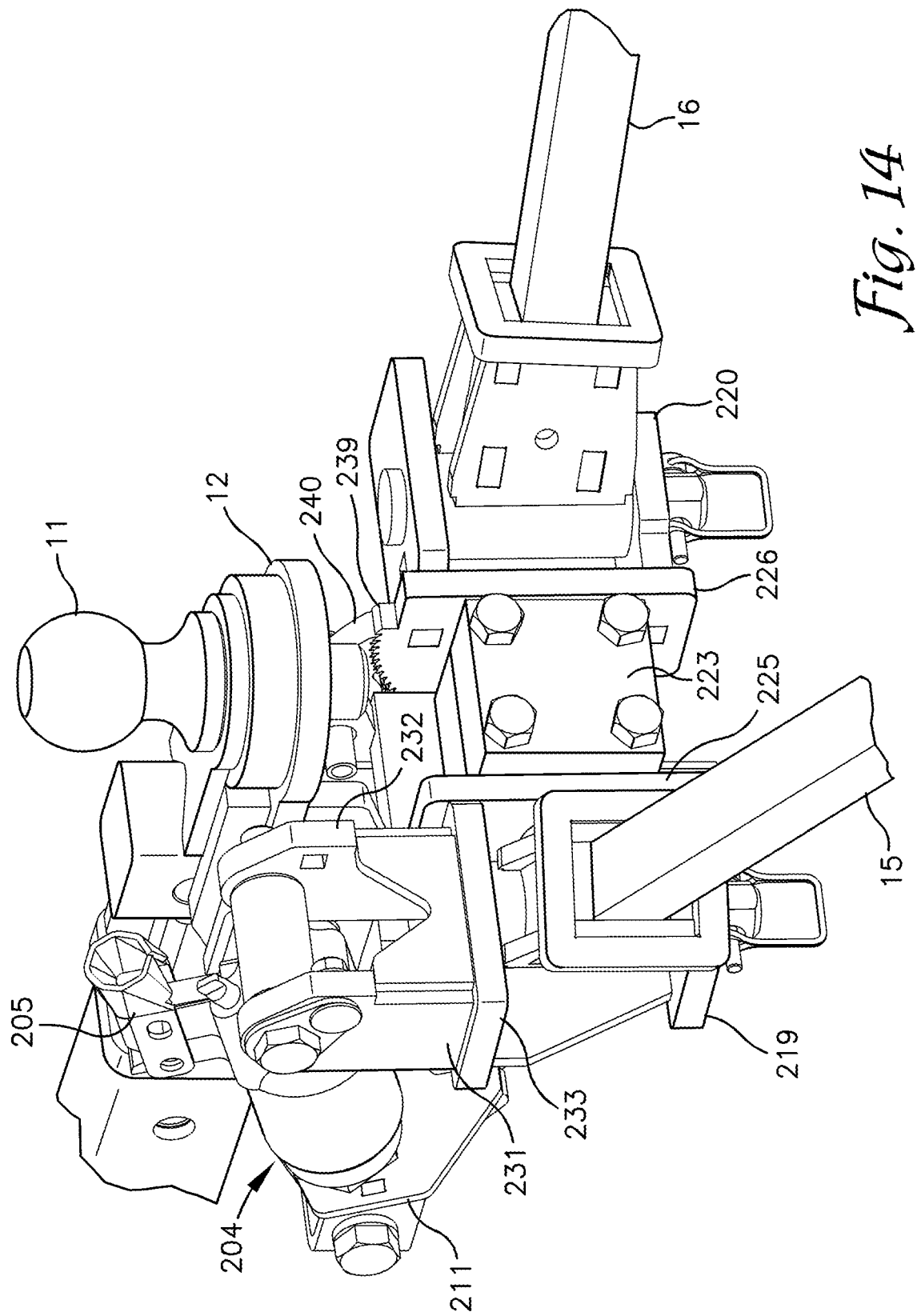
FIG. 14 is a fragmentary, rear perspective view of the weight distributing hitch as in FIG. 13.

As shown in FIG. 12, the bottom 141 of the slide block 17 may be sloped upward from the transverse groove 140 toward the front and rear ends to provide clearance for the front or rear edges of the block bottom 141 relative to the projection 142 to allow the bottom 141 of the block 17 to pass back over the projection 142 upon straightening of the trailer 2 relative to the vehicle 3 after the front or rear edge of the block 17 has been advanced completely past the projection 17 during a relatively sharp turn.

Figure 16:
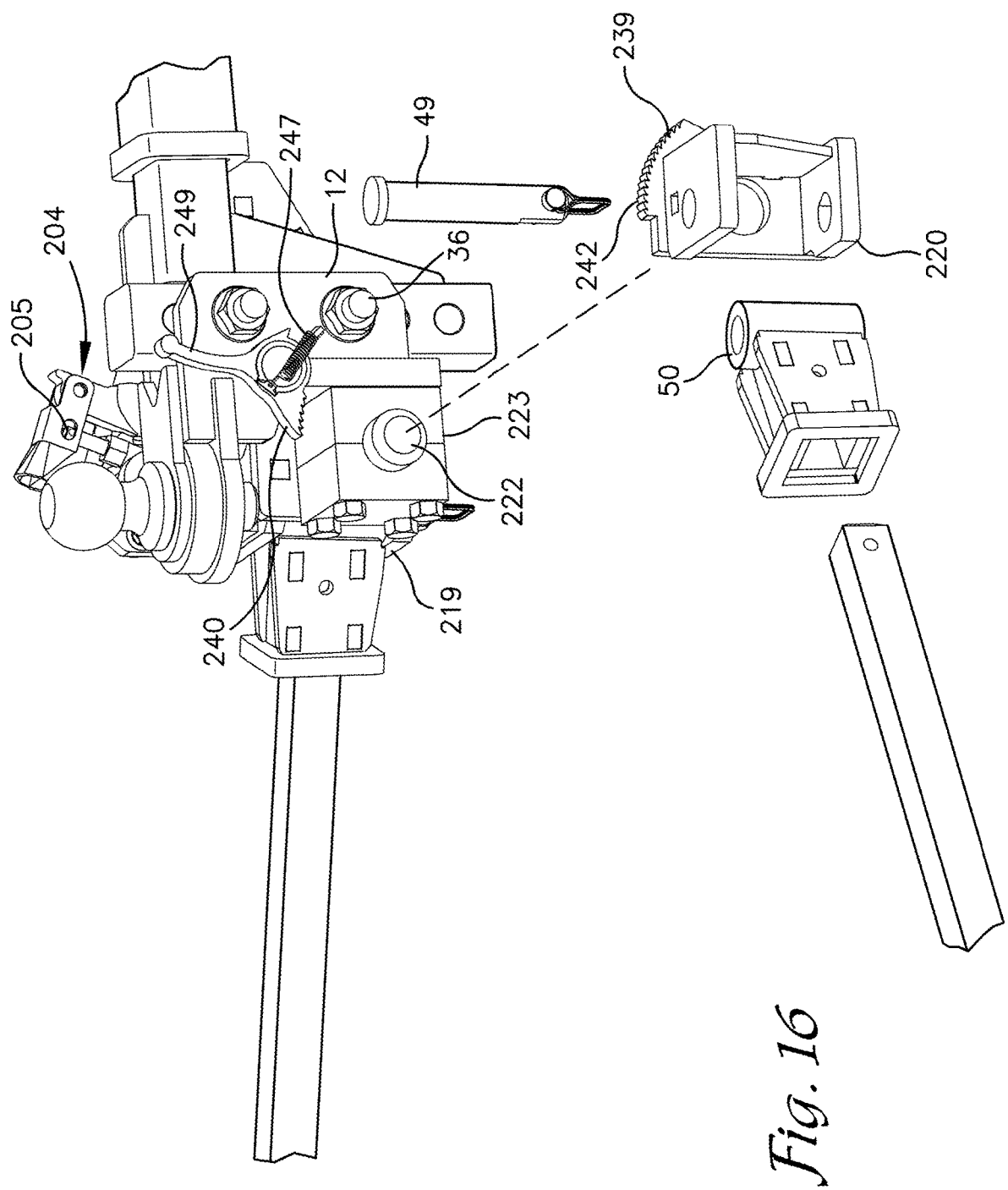
FIG. 16 is a partially exploded, fragmentary, right side perspective view of the weight distributing hitch as in FIG. 13.
Figure 17:
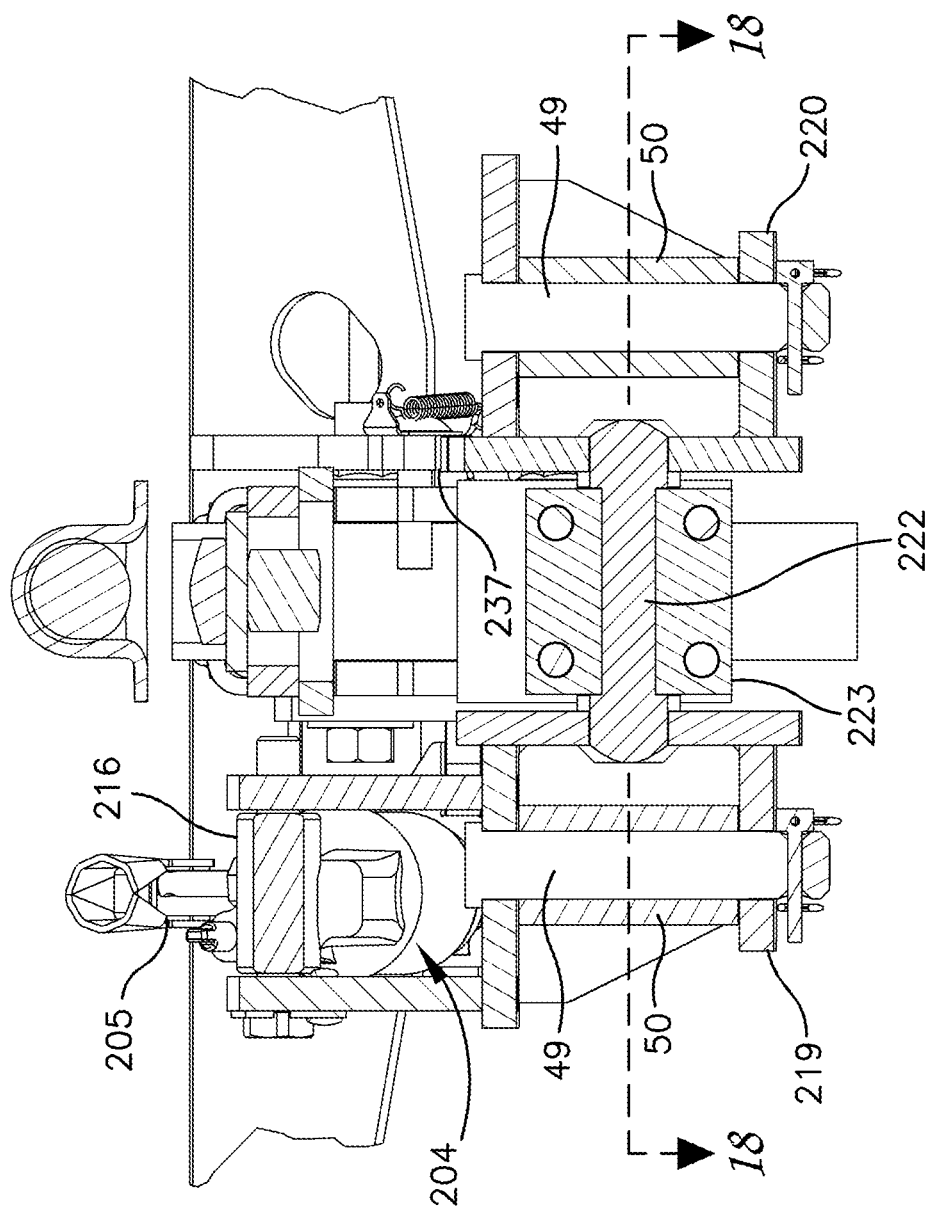
FIG. 17 is a fragmentary cross-sectional view taken generally along line 17-17 of FIG. 13.
Figure 18:
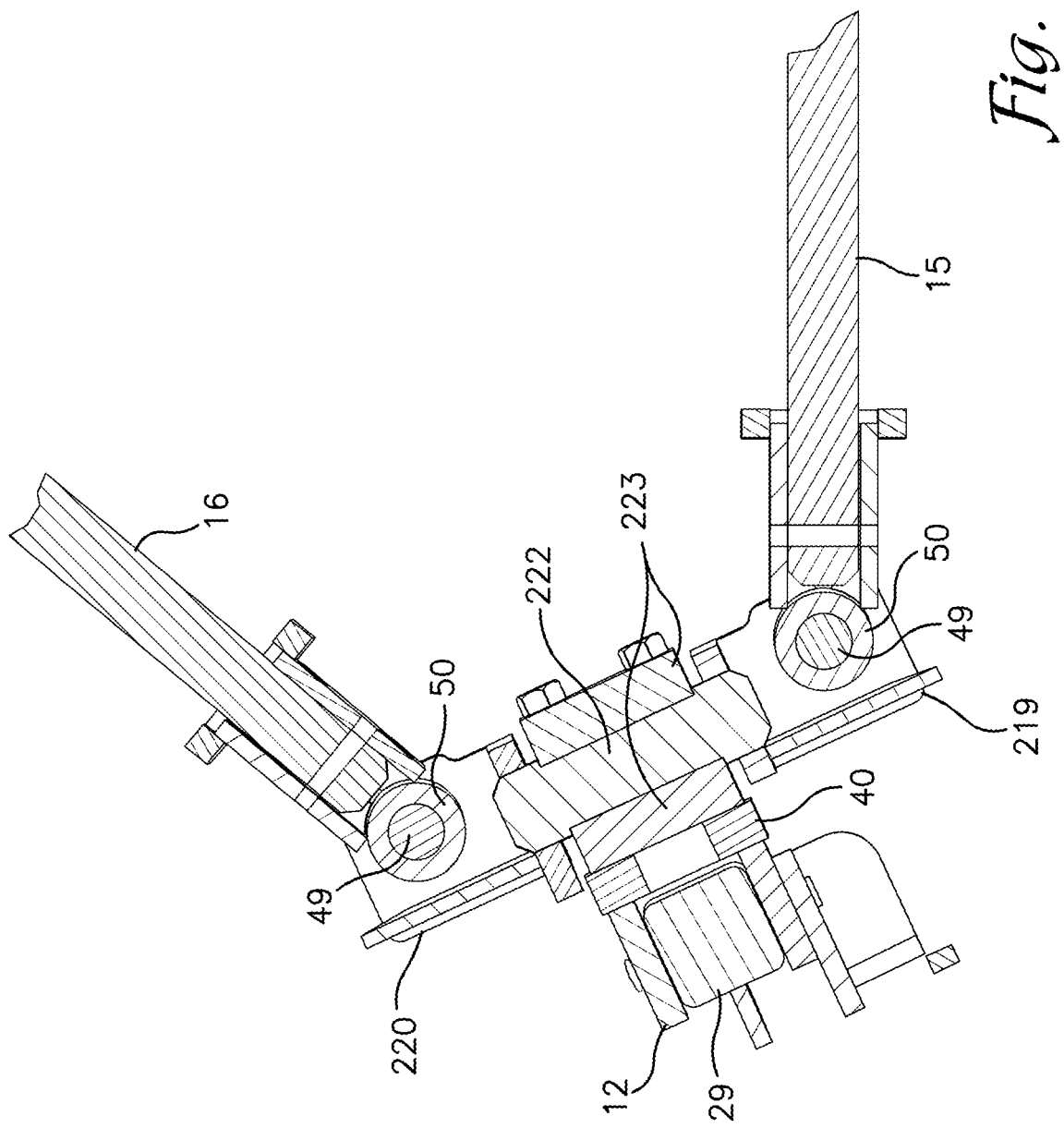
FIG. 18 is a fragmentary cross-sectional view taken generally along line 18-18 of FIG. 17.

An alternative embodiment of the weight distributing hitch 201 is shown in FIG. 16 incorporating a modified hitch head 203 and an alternative jack or actuator 204. In describing the alternative embodiment 201, components which correspond to the same or similar components in the first embodiment of the hitch 1 are identified with the same reference numbers. In hitch 201 the jack 204 incorporates a manually operated pump 205. A distal end or bottom 207 of a cannister or reservoir 209 of the jack 204 is pivotally connected to a mounting bracket or support bracket 211 projecting laterally from a bracket mounting plate 212 connected to one of the vertical flange plates 33 or 34 of the ball mount 12 using pins 36. In the embodiment shown, the bracket mounting plate 212 is connected to the left vertical flange plate 33 using mounting pins 36 received within mounting holes 35 of vertical flange plates 33 and 34.

Jack 204 includes a piston 215 extendable and retractable relative to the cannister 209 using or releasing the manually operated pump 205. A distal end 216 of the piston 215 is pivotally connected to a lever arm assembly 217 connected to and projecting upward from a modified, left spring arm mount 219 connected to a right, spring arm mount 220 by modified pivot shaft 222. Pivot shaft 222 is rotatably connected to the ball mount 12 by pivot bearing assembly 223. Each end of the pivot shaft 222 is fixedly connected to an inner flange plate 225 and 226 of a respective spring arm mount 219 and 220 such that the spring arm mounts 219 and 220 rotate together with the pivot shaft 222.

The lever arm assembly 217 is formed as two spaced apart lever arms 231 and 232 connected to and projecting upward from an upper pivot pin support plate 233 of spring arm mount 219. A pivot pin 235 extending through and between the lever arms 231 and 232 and through an eyelet or pivot bearing 236 connected to the distal end 216 of piston 215 connects the distal end 216 of piston 215 to the lever arm assembly 217. Extension of piston 215 rotates the interconnected, spring arm mounts 219 and 220 rearward and downward such that distal ends 18 of the spring arms 15 and 16 connected to the spring arm mounts 219 and 220 are rotated downward against a support shelf 20 on which they are supported to load the spring arms 15 and 16 relative to the respective support shelf 20. Retraction of the piston 215 rotates the spring arm mounts 219 and 220 and the distal ends 18 of the attached spring arms 15 and 16 upward and forward to release loading of the spring arms 15 and 16 on the respective support shelf 20 on which it is supported.

Figure 15:
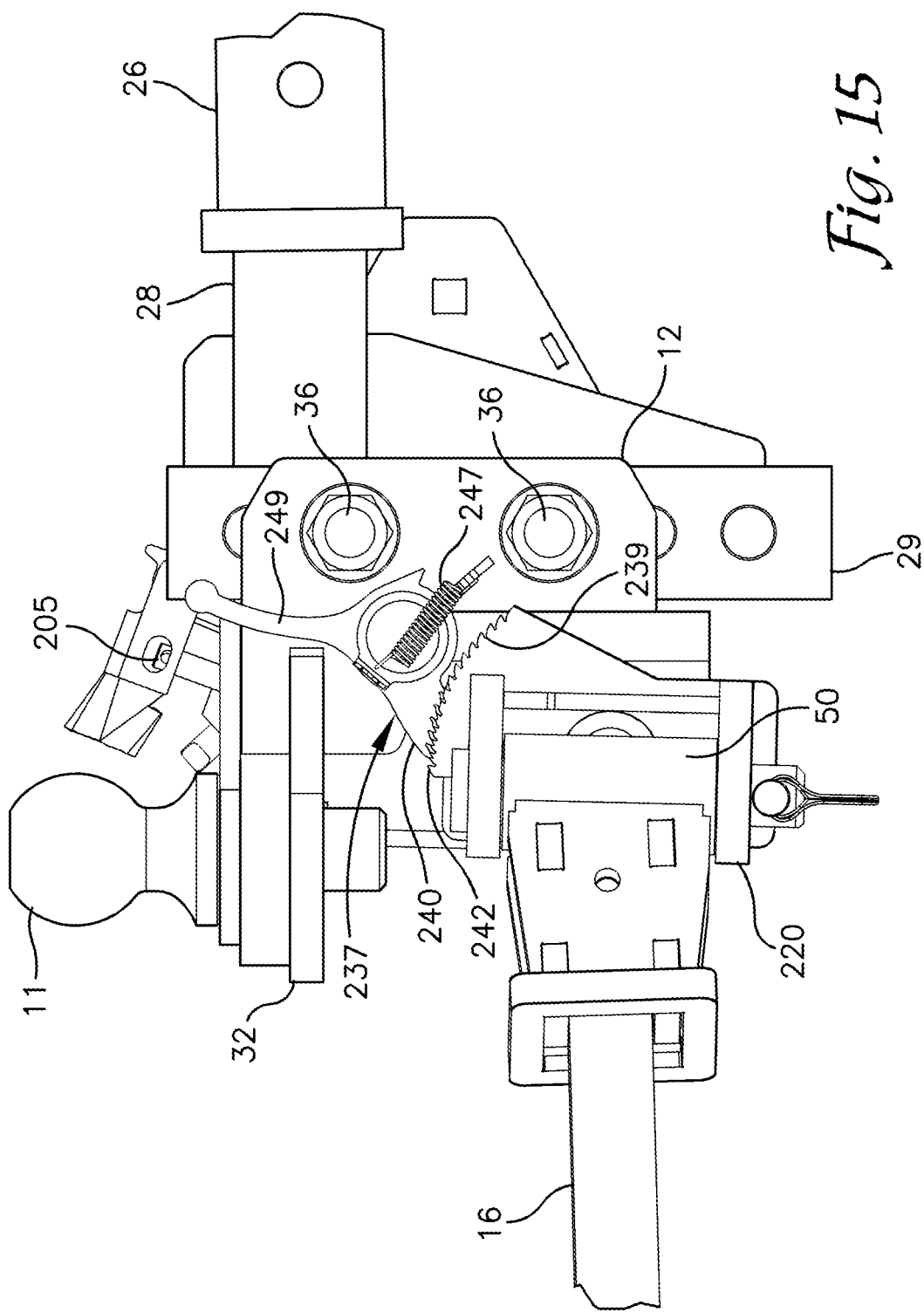
FIG. 15 is a fragmentary, right elevational view of the weight distributing hitch as in FIG. 13.

Referring to FIGS. 15 and 16, a ratcheted latch assembly 237 is incorporated into the modified hitch head 203 to hold the spring arms 15 and 16 in a loaded position relative to the support shelves 20 if the jack 204 is inadvertently released or loses pressure to hold the spring arms 15 and 16 in the loaded position. Latch assembly 237 includes a toothed ratchet strip 239 formed on an upper surface of the inner flange plate 226 of right spring arm mount 220 and a pawl 240 pivotally mounted on the right, vertical flange plate 34 of the ball mount 12. The toothed ratchet strip 239 curves forward and downward and includes a plurality of teeth 242 projecting in a forwardly angled orientation. The pawl 240 has a plurality of mating teeth 244 formed on a lower surface thereof which is formed in a complementary curve to the curves surface of the toothed ratchet strip 239. The mating teeth 244 of pawl 240 project rearward and intermesh with the forwardly projecting teeth on the ratchet strip 239 when pivoted into engagement therewith. A tension spring 247 connected between the pawl 240 and vertical flange plate 34 of the ball mount 12 at a position below the pawl 240 normally draws the pawl 240 into engagement with the ratchet strip 239. Intermeshing of the rearwardly projecting mating teeth 244 on pawl 240 with the forwardly projecting ratchet teeth 242 on ratchet strip 239 prevent the spring arm mounts 219 and 220 and attached spring arms 15 and 16 from pivoting upward and forward off of the support shelves 20.

A lever arm 249 is connected to the pawl 240 on a side opposite the pivot point of the pawl 240 relative to the vertical flange plate 34. The lever arm 249 can be used to manually pivot the pawl 240 out of engagement with the ratchet strip 239 and permit upward and forward pivoting of the sprig arm mounts 219 and 220 and the attached spring arms 15 and 16 relative to the spring arm support shelves 20.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A weight distributing hitch assembly for towing a trailer behind a towing vehicle, the weight distributing hitch comprising:
   a hitch head;
   a spring arm having a first end connected to a spring arm mount which is pivotally connected to said hitch head about a pivot axis extending transverse to said hitch head, said spring arm having a second end projecting rearward from said hitch head;
   a spring arm support connectable to the trailer such that said spring arm may be operably supported by the spring arm support proximate the second end thereof;
   an actuator having a first end supported on said hitch head forward of said pivot axis and a second end operably connected to said spring arm mount to selectively and operably apply a downward rotational force on the spring arm relative to said spring arm support when said second end of said spring arm is supported on said spring arm mount.

2. The weight distributing hitch assembly as in claim 1 further comprising a lever arm projecting from said spring arm mount and said second end of said actuator is connected to said lever arm such that extension of said actuator applies the downward rotational force on the spring arm relative to the spring arm support.

3. The weight distributing hitch assembly as in claim 1 wherein said spring arm mount is fixedly connected to a pivot shaft rotatably mounted to said hitch head.

4. The weight distributing hitch assembly as in claim 1 further comprising a support platform connected to said hitch head forward of the pivot axis and said actuator comprises a hydraulic jack.

5. A weight distributing hitch assembly for towing a trailer behind a towing vehicle, the trailer including first and second sides and the weight distributing hitch comprising:
   a hitch head;
   first and second spring arms each connected at a first end to a first and second spring arm mount respectively and having a second end projecting rearward from said hitch head, said first and second spring arm mounts pivotally connected to said hitch head to pivot about a pivot axis extending transverse to said hitch head;
   first and second spring arm supports connectable to the first and second sides of said trailer respectively such that said first and second spring arms may be operably supported by the first and second spring arm supports proximate the second ends thereof;
   an actuator having a first end supported on said hitch head forward of said pivot axis and a second end operably connected to the first and second spring arm mounts and selectively operable to rotate the first and second spring arms relative to the hitch head and to apply a downward rotational force on the first and second spring arms relative to said first and second spring arm supports on which the first and second spring arms are supported proximate the second ends thereof.

6. The weight distributing hitch assembly as in claim 5 wherein said first and second spring arm mounts are fixedly connected on opposite ends to a pivot shaft which is rotatably connected to the hitch head.

7. The weight distributing hitch assembly as in claim 6 further comprising a lever arm projecting from said first spring arm mount and said second end of said actuator is connected to said lever arm such that extension of said actuator applies the downward rotational force on the first and second spring arms relative to the first and second spring arm supports.

8. The weight distributing hitch assembly as in claim 5 further comprising a support platform connected to said hitch head forward of the pivot axis and said actuator comprises a hydraulic jack.

9. A weight distributing hitch assembly for towing a trailer behind a towing vehicle, the trailer including first and second sides and the weight distributing hitch comprising:
- a hitch head;
- first and second spring arms each connected at a first end to opposite ends of a pivot shaft rotatably connected to and extending laterally relative to the hitch head and pivotable about a pivot axis extending transverse to said hitch head, a second end of each of the first and second spring arms projecting rearward from said hitch head;
- first and second spring arm supports connectable to the first and second sides of said trailer respectively such that said first and second spring arms may be supported by the first and second spring arm supports proximate the second ends thereof;
- an actuator operably connected between the hitch head and the first and second spring arms for rotating the first and second spring arms relative to the hitch head and applying a downward rotational force on the first and second spring arms relative to said first and second spring arm supports on which the first and second spring arms are supported proximate the second ends thereof.

10. The weight distributing hitch assembly as in claim 9 wherein said first end of each of the first and second spring arms are connected to first and second spring arm mounts respectively and the first and second spring arm mounts are fixedly connected to a respective opposite end of the pivot shaft.

11. The weight distributing hitch assembly as in claim 10 where in said first end of each of the first and second spring arms is pivotally connected to the first and second spring arm mounts for pivoting about a vertical pivot axis.

12. The weight distributing hitch assembly as in claim 10 further comprising a lever arm projecting from said first spring arm mount and a first end of said actuator is supported on said hitch head and a second end of said actuator is connected to said lever arm such that extension of said actuator applies the downward rotational force on the first and second spring arms relative to the first and second spring arm supports.

13. The weight distributing hitch assembly as in claim 9 further comprising a support platform connected to said hitch head forward of the pivot axis of said pivot shaft and said actuator comprises a hydraulic jack.

\* \* \* \* \*